(12) United States Patent
Dressen et al.

(10) Patent No.: US 7,308,516 B2
(45) Date of Patent: Dec. 11, 2007

(54) BI-DIRECTIONAL SERIAL INTERFACE FOR COMMUNICATION CONTROL

(75) Inventors: David W. Dressen, Pueblo West, CO (US); Gregory S. Guez, Marseilles (FR)

(73) Assignee: Atmel Corporation, San Jose, CA (US)

( * ) Notice: Subject to any disclaimer, the term of this patent is extended or adjusted under 35 U.S.C. 154(b) by 32 days.

(21) Appl. No.: 10/831,911

(22) Filed: Apr. 26, 2004

(65) Prior Publication Data
US 2005/0239503 A1 Oct. 27, 2005

(51) Int. Cl.
*G06F 13/42* (2006.01)
*G06F 15/16* (2006.01)

(52) U.S. Cl. ...................... 710/110; 709/208

(58) Field of Classification Search ............. 710/110, 710/107, 305, 31, 105; 709/208, 209
See application file for complete search history.

(56) References Cited

U.S. PATENT DOCUMENTS

| | | | | |
|---|---|---|---|---|
| 4,689,740 A | | 8/1987 | Moelands et al. .......... 364/200 |
| 5,303,227 A | * | 4/1994 | Herold et al. ............. 370/276 |
| 5,479,582 A | * | 12/1995 | Abrams et al. ............ 710/1 |
| 5,600,803 A | * | 2/1997 | Iitsuka et al. ............ 709/208 |
| 6,046,676 A | * | 4/2000 | Ward et al. ............ 340/572.1 |
| 6,434,650 B1 | * | 8/2002 | Morris et al. ............ 710/110 |
| 6,457,078 B1 | * | 9/2002 | Magro et al. ............ 710/105 |
| 6,480,101 B1 | * | 11/2002 | Kelly et al. ............ 340/10.2 |
| 6,651,190 B1 | * | 11/2003 | Worley et al. ............ 714/43 |
| 6,665,757 B1 | * | 12/2003 | Tsujita et al. ............ 710/110 |
| 6,763,413 B2 | * | 7/2004 | Oh ............ 710/107 |
| 6,912,606 B2 | * | 6/2005 | Fay ............ 710/64 |
| 2004/0019816 A1 | * | 1/2004 | Smith et al. ............ 713/400 |

OTHER PUBLICATIONS

Website printout: Embedded.com, "Introduction to I2C", 5 pages.
Website printout: CardWerk Smarter Card Solutions, "ISO 7816-3 Smart Card Standard: Part 3, Electronic Signals and Transmission Protocols", 17 pages.
Website printout: Atmel Dataflash, Application Note (AN-4), "Using Atmel's Dataflash", 2002, 30 pages.
Analog Devices:"LC2MOS Loop-Powered Signal Conditioning ADC", Product Spec.[Online] Mar. 2004, pp. 1-28; XP002434371, U.S.A.
Website printout: Embedded.com, "Introduction to I2C", 5 pages, printout on Nov. 21, 2003.
Website printout: CardWerk Smarter Card Solutions, "ISO 7816-3 Smart Card Standard: Part 3, Electronic Signals and Transmission Protocols", 17 pages, printout on Jul. 13, 2004.

* cited by examiner

*Primary Examiner*—Christopher E. Lee
*Assistant Examiner*—Trisha Vu
(74) *Attorney, Agent, or Firm*—Schneck & Schneck; Thomas Schneck

(57) ABSTRACT

A bi-directional serial interface for serial communication having a control line to facilitate the transmission of data to and from a microcontroller and a serial interface module. The control line can be used by both the microcontroller and the serial interface module to send controlling signals such as start signals, receipt acknowledge signals, error signals, and stop signals. By having a dedicated control line that can be used by both the sending device and the receiving device, the present invention allows the initiation of a communication session by either the microcontroller or the serial interface.

8 Claims, 4 Drawing Sheets

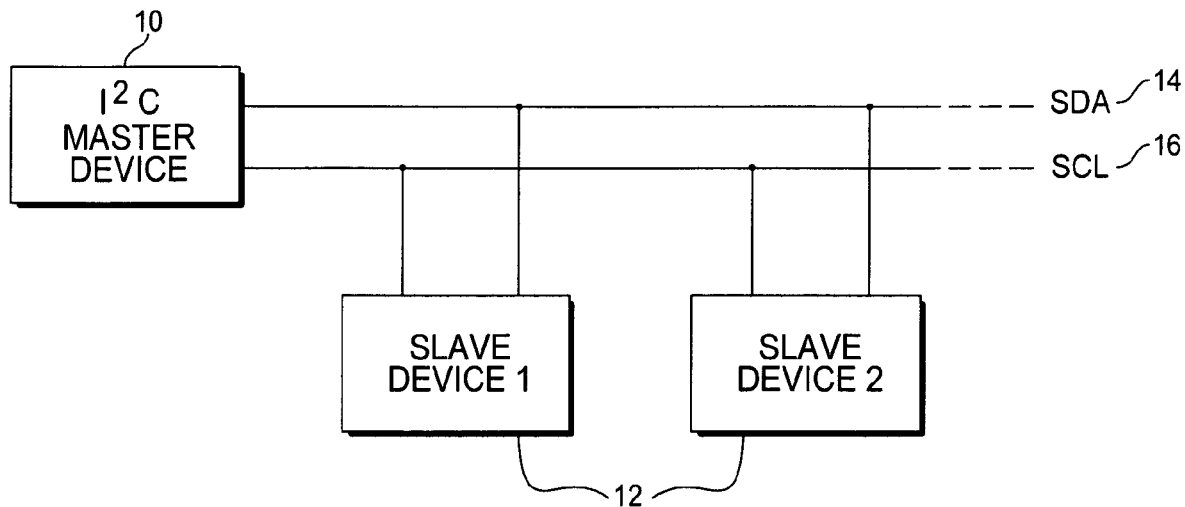
Fig._1
*(Prior Art)*
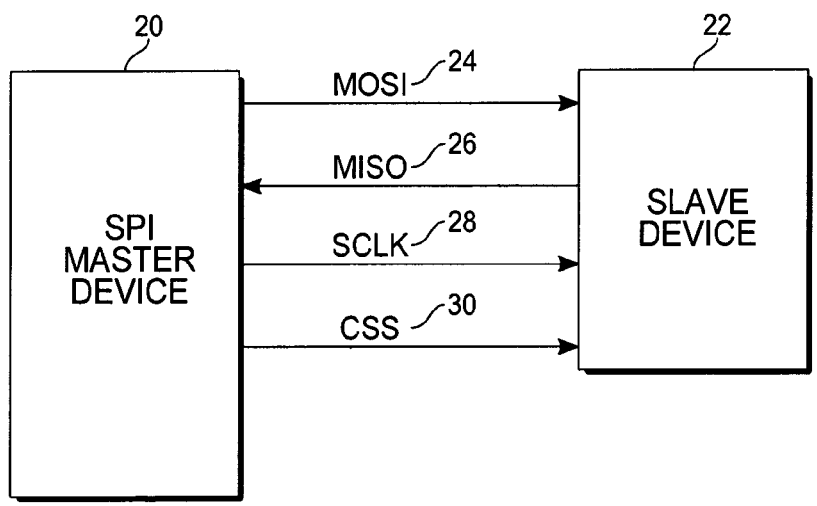
Fig._2
*(Prior Art)*

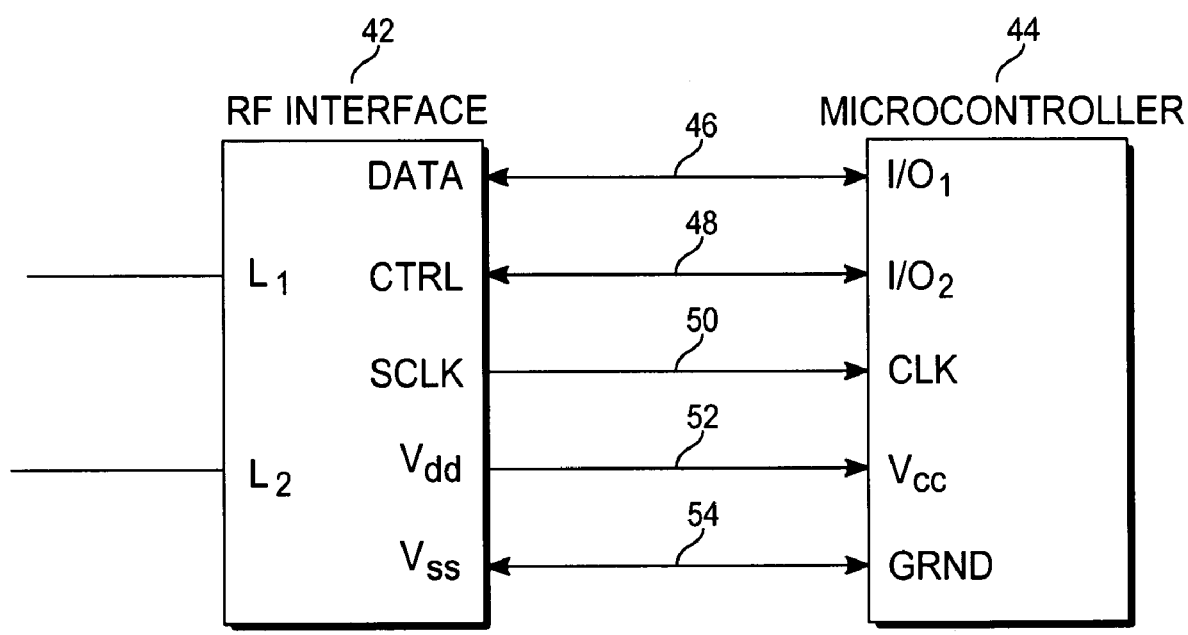
Fig._3

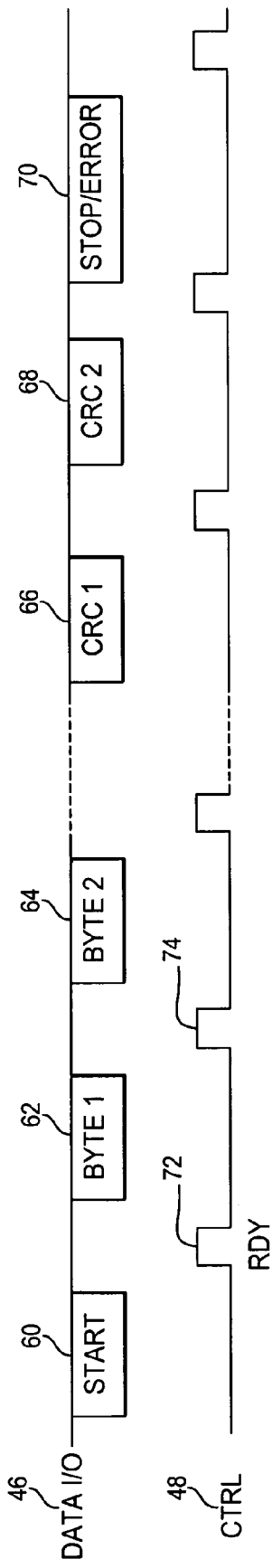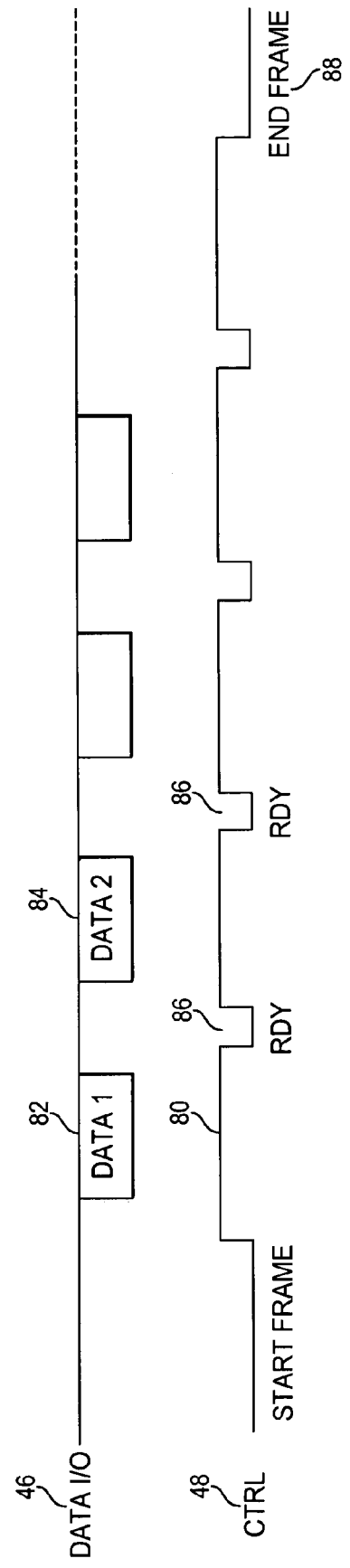

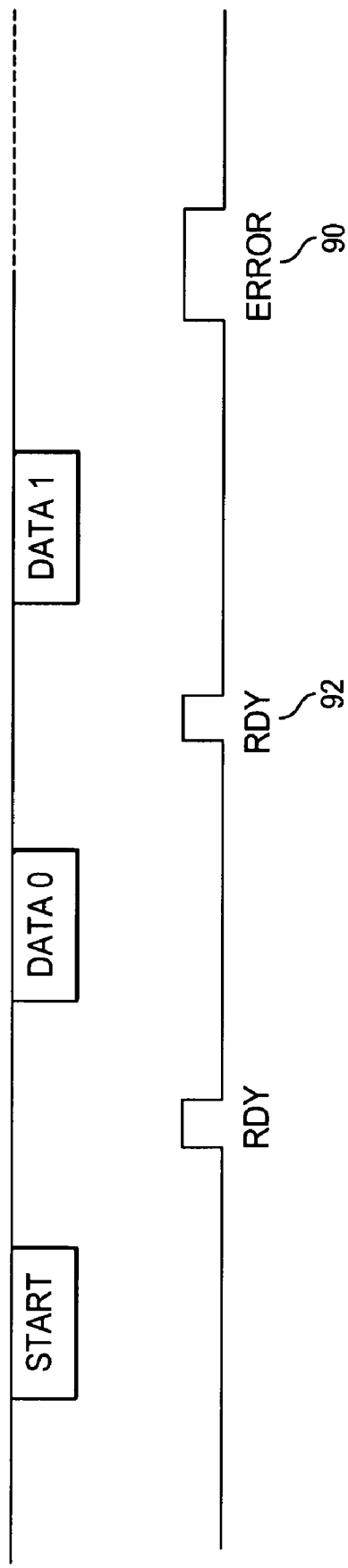
Fig._6

BI-DIRECTIONAL SERIAL INTERFACE FOR COMMUNICATION CONTROL

TECHNICAL FIELD

The present invention relates to a communication interface for a microcontroller. More particularly, the present invention relates to a serial interface that facilitates the communication between a microcontroller and a remote device.

BACKGROUND ART

A common serial communication interface known as Inter-Integrated Circuit bus ($I^2C$) utilizes two wires for data transfer: a serial data (SDA) line for serial transmission of data and a serial clock (SCL) line for the transmission of a clock signal. With reference to FIG. 1, the SDA 14 and the SCL 16 lines originate from a master device 10 such as a microcontroller. One or more slave devices 12, such as an RF serial interface, could be connected to the master device 10 through the SDA line 14 and the SCL line 16. Each communication session must be initiated by the master device 10, which also controls the clock signal on the SCL line 16. Each slave device 12 comes with a predefined device address, the lower bits of which may be configurable at a board level. The master device 10 transmits a device address of the intended slave at the beginning of every transaction. Each slave device 12 is responsible for monitoring the SDA line 14 and responds only to its own address. The master device 10 begins the communication by issuing a start condition. The master device 10 then sends a unique 7-bit slave device address, with the most significant bit first. The eighth bit after the start condition specifies whether the slave device 12 is to receive ("0") or to transmit ("1"). Upon receipt and recognition of the slave device 12 address, the addressed slave device 12 sends an ACK bit on the SDA line 14 to signify that it is ready to receive or to transmit. Then the transmitter (slave device 12 or master device 10, as indicated by the content of the ACK bit) transmits a byte of data starting with the most significant bit. After receiving the data byte, the receiver issues a new ACK bit. This 9-bit pattern is repeated if more bytes need to be transmitted.

In a write transaction (slave device 12 receiving), when the master device 10 is done transmitting all of the data bytes it wants to send, it monitors for a last ACK signal and then issues a stop condition on the SDA line 14. In a read transaction (slave device 12 transmitting), the master device 10 does not acknowledge the final byte it receives. Instead, it issues a stop condition, indicating that it has received all the information it asked for.

Another common option for low-cost, low speed communication is a serial peripheral interface (SPI). SPI specifies four signals: clock (SCLK), master data output/slave data input (MOSI), master data input/slave data output (MISO), and slave select (CSS). Similar to $I^2C$, SPI devices communicate using a master-slave relationship. FIG. 2 shows these four signals in a single-slave configuration. In the figure, an SPI master device 20 is connected to one or more slave devices 22 through four lines carrying the MOSI signal 24, the MISO signal 26, the SCLK signal 28, and the CSS signal 30. The SCLK signal 28 and the CSS signal 30 are generated by the master device 20 and are provided to all connected slave devices 22. Each additional slave device shares the same MOSI signal line 24, MISO signal line 26, and SCLK signal line 28 but each slave device has its own dedicated CSS signal line 30 connected the master device 20.

The MOSI signal line 24 carries data from the master device 20 to the slave device 22. The MISO signal line 26 carries data from the slave device 22 back to the master device 20. A slave device 22 is selected when the master device 20 asserts the particular CSS signal line 30 that is connected to a particular slave device 22. With two data lines, one for each traffic direction, SPI allows full duplex data transmission. Once the master device 20 generates a clock signal and selects a slave device 22, data may be transferred in both directions simultaneously. In fact, as far as SPI is concerned, data are always transferred in both directions. It is up to the master 20 and slave devices 22 to know whether a received byte is meaningful or not.

With an ability to stream data (as opposed to reading and writing addressed locations in a slave device), an SPI system provides a high data transfer rate. However, the SPI does not have an acknowledgement mechanism to confirm receipt of data, nor does it offer any flow control. Without a communication protocol, the SPI master has no knowledge of whether a slave even exists.

A limitation common to both the $I^2C$ interface and the SPI interface is that the communicating devices must be configured into a master/slave relationship, which means that the master is the only device that can initiate a communication session. Furthermore, without any acknowledgment mechanism, the SPI has no way to prevent buffer overflows in the receiving device. In the case of $I^2C$, though an acknowledge bit is sent by the receiver each time a byte is received, the acknowledge bit has to be sent through the data line. As a result, the rate of data transfer is reduced. Therefore, it would be desirable to have an interfacing system that allows either of the communicating devices to initiate a communication session. It would also be desirable to have an interfacing system that provides a buffer overflow protection mechanism that does not take up communication bandwidth.

DISCLOSURE OF INVENTION

The present invention teaches a serial interface system that uses a single line between the communicating devices for a bi-directional data transfer and a control line between the communicating devices to facilitate data transfer. Either of the devices can initiate a communication session. Upon receipt of a data byte, the receiving device sends an acknowledgement signal on the control line to indicate receipt of the byte.

BRIEF DESCRIPTION OF THE DRAWINGS

FIG. 1 is a block diagram showing an $I^2C$ prior art serial interface.

FIG. 2 is a block diagram showing an SPI prior art serial interface in a single master/single slave configuration.

FIG. 3 is a block diagram showing an embodiment of a serial interface of the present invention.

FIG. 4 is a signal diagram showing the data and control signals involved in the transmission of serial data from the serial interface to the microcontroller according to an embodiment of the present invention.

FIG. 5 is a signal diagram showing the data and control signals involved in the reception of serial data from the microcontroller to the serial interface according to an embodiment of the present invention.

FIG. 6 is a signal diagram showing a control signal for an erroneous reception according to an embodiment of the present invention.

BEST MODE FOR CARRYING OUT THE INVENTION

An exemplary embodiment of the present invention will be described herein in connection with an RF (radio-frequency) interface for a processing unit such as a microcontroller, a microprocessor, or a finite state machine. However, it should be understood that the present invention is not limited to RF interface. It can be applied to any serial interface between two or more devices.

FIG. 3 shows an RF serial interface that incorporates the teachings of present invention. The system shown is a contactless smart card (not shown), which comprises a microcontroller 44 and an RF interface module 42 residing in a credit card sized plastic enclosure wherein the RF interface module 42 receives RF signals from, for example a balanced line (not shown), an antennae connected to a first and a second antennae terminal L1 and L2. Electrical power may also be received through a power input line from an external source such as a battery or fuel cell. The RF module 42 extracts RF signals and power from the RF signals and then sends the extracted data signal to the microcontroller 44 through a bi-directional data line 46 and supplies power to the microcontroller 44 through a power line 52. A grounding line 54 is also provided by the RF interface module 42 for proper grounding of the microcontroller 44. The RF interface module 42 also provides a free running clock to the microcontroller 44 through a clock line 50 after the RF interface module 42 has completed a power-on-reset sequence. A control line 48 provides a second communication channel for both the RF interface module 42 and the microcontroller 44 to initiate and terminate communication sessions and terminate communication sessions and provide reception acknowledgment during a communication session.

As the present invention relates primarily to the serial interface between a serial interface module 42 and a microcontroller 44, to keep the description and explanation clear and precise, the communication between the RF interface module 42 and an external device, such as a smart card reader (not shown), would be kept to a minimum. It will be understood that the RF interface module 42 is the intermediary between the microcontroller 44 and the smart card reader. The smart card reader either reads from or writes to the microcontroller 44 through the RF interface module 42 via the antenna connected to the first or second antenna terminals L1 or L2. All communication with the smart card reader is conducted in packets of variable size. In ISO/IEC 14443 compliant applications the smart card reader always transmits a packet containing a command to the smart card, which returns a single response packet. There are other smart card protocols that require the smart card to send a packet first, or allow the smart card to send multiple packets in response to a single command. The present embodiment of the invention supports all of these protocol options. For the sake of simplicity, the following examples illustrate protocol where a single command packet sent by the smart card reader results in a single response packet from the smart card, which consists of an RF interface module 42 with antenna and a microcontroller or logic module 44.

During a read session the smart card reader transmits a read command packet in RF form to the RF interface module 42. The read command packet consists of a communication preamble, one or more bytes, and a communication stop sequence. As the read command packet is received by the RF interface module and transferred byte by byte through the data line to the microcontroller 44 using the receive signaling illustrated in FIG. 4. The microcontroller 44 processes the received packet and responds by using the transmit signaling illustrated in FIG. 5 to transfer the response data byte by byte through the data line 46 to the RF interface module 42, which transmits a response packet in RF form to the smart card reader. The response packet consists of a communication preamble, one or more bytes, and a communication stop sequence.

During a write session the smart card reader transmits a write command packet in RF form to the RF interface module 42. The write command packet consists of a communication preamble, one or more bytes, and a communication stop sequence. As the write command packet is received by the RF interface module and transferred byte by byte through the data line 46 to the microcontroller 44 using the receive signaling illustrated in FIG. 4. The microcontroller 44 processes the received packet and responds by using the transmit signaling illustrated in FIG. 5 to transfer the response data byte by byte through the data line 46 to the RF interface module 42, which transmits a response packet in RF form to the smart card reader. The response packet consists of a communication preamble, one or more bytes, and a communication stop sequence.

The only difference between a read session and a write session is the content of the packets sent by the smart card reader and by the microcontroller 44. In both the read and write examples the bytes received by the RF interface module 42 are extracted from the RF signal and transferred over the serial interface to the microcontroller 44. The microcontroller's 44 response is transferred over the serial interface to the RF interface module 42, which transmits the data in RF signal form to the smart card reader. In the present invention the transmit or receive state is controlled by the state of the control line, and not by the content of the bytes on the data line 46.

A detailed implementation of an exemplary communication between the RF interface module 42 and the microcontroller 44 is described below. When the RF interface module 42 starts receiving RF data from the external device, it initiates a communication session with the microcontroller 44 to pass along the data. With reference to FIG. 4, the RF interface module 42 transmits serial data to the microcontroller 44 through the serial data line 46 in the follow manner: When the RF interface module 42 receives a valid communication preamble, a start byte 60 is transmitted to the microcontroller 44. An example of a start byte 60 can be 00h. The microcontroller 44 responds with a READY signal 72 on the control line 48 to indicate that it is ready to receive. In the present embodiment, the ready signal is a positive pulse on the control line 48 with a duration of one serial time unit (STU), which is the time required to transmit or receive one data bit over the serial interface. Upon detection the READY signal 72, the RF interface module 42 sends a first data byte 62 to the microcontroller 44. The microcontroller 44 responds with a second READY signal 74 on the control line 48 to indicate that it is ready to receive the new data byte. All subsequent data bytes 62, 64 are clocked out to the microcontroller 44 a similar manner. The last two bytes in the example are a first and second CRC (cyclic redundancy check) byte 66, 68 sent by the external device, such as a smart card reader, for the purpose of data checking. When the RF interface module 42 receives a communication stop sequence from the external device, such as a smart card reader, a single stop byte is sent to the microcontroller 44 to end the transmission. In the present embodiment of the invention a CRC code is computed as each packet is received from the device and compared with the CRC code at the end of the packet. If the CRC computed by the RF interface module 42 does not match, then an error code is inserted in the stop byte. An example of a stop byte is 00h if no errors are detected. A CRC code is not required by the serial interface, however a CRC code is commonly used to improve the reliability of communication in the form of RF signals. In communication protocols where a CRC is implemented, validation of the CRC code is necessary to insure that defective data packets are not processed. The CRC validation function can be performed in the microcontroller 44 or in the RF interface module 42. In the present embodiment of the invention the CRC computation and validation is performed by the RF interface module 42.

When the microcontroller 44 is ready to transmit data, such as the case when the external device has made a read request, the microcontroller initiates the communication session with the RF interface module 42 by sending a start frame 80 on the control line 48 as shown in FIG. 5. In the present embodiment, the start frame 80 is a high signal on the control line 48. The microcontroller 44 then sends a first data byte 82 through the serial data line. Upon receipt of the first data byte 82, the RF interface module 42 pulls the control line 48 low for a STU, which acts as a READY signal 86 signifying the receipt of the data byte and its readiness to accept the next data byte. Once the microcontroller 44 detects the READY signal 86, it proceeds with the transmission of a second data byte 84. Upon receipt of the second data byte 84, the RF interface module 42 sends another READY signal 86 to acknowledge receipt. These steps of receiving a data byte and sending an acknowledgment can be repeated until all data bytes have been sent, at which point, the microcontroller 44 takes the high signal off the control line 48, which is interpreted by the RF interface module 42 as an end frame 88. Based on the data byte received from the microcontroller 44, the RF interface module 42 generates 2 CRC bytes and sends them to the external source for error checking purposes.

While the RF interface module 42 is in the receiving mode, the antenna L1, L2 may receive command frames that are intended for another system. These frames can be identified by the microcontroller 44 after receiving just a few bytes. For example, the frame may contain an invalid command code or a device identification code which does not match the code which was assigned by an anticollision sequence. (Anticollision procedures allow multiple RF smart cards to communicate with a single smart card reader.) As shown in FIG. 6, upon receipt of these frames, the microcontroller 44 can force the RF interface module 42 to abort receipt of the frames by returning an ERROR signal 90 on the control line 48 instead of a READY signal 86. Such an ERROR signal 90 would force the RF interface module 42 to return to an idle state, waiting for the next SOF. In the figure, the ERROR signal 90 is a high signal on the control line 48 that has a duration that is, for example, three times the duration of a READY signal 92.

Although the present invention has been explained in terms of particular exemplary embodiments, one skilled in the art will realize that additional embodiments can be readily envisioned that are within the scope of the present invention.

For example, the RF interface could be replaced by an interface for other transmission medium such as optical cables and electrical wires. For instance, the present invention can be used for a contact smart card interface such as one prescribed by ISO 7816, an optical communication interface such as one using fiber optic or free space, a power line carrier communication interface such as an X10 module, or an acoustical communication interface using ultrasonic transmission means. Therefore, the scope of the present invention will be limited only by the appended claims.

What is claimed is:

1. A serial interface for a microcontroller comprising:
  a single serial data line coupling said serial interface to said microcontroller, said serial data line configured to carry data to and from said serial interface;
  a single control signal line coupling said serial interface to said microcontroller, said control signal line configured to carry at least one control signal to and from said serial interface, either one of said microcontroller or said serial interface capable of initiating a communication session; and
  a first and second antenna pin that are coupled to an antenna, said antenna being configured for wireless reception and transmission of at least one radio frequency signal data between said microcontroller and a remote device, wherein said serial interface is configured to transmit a data byte received through said antenna through said serial data line upon receipt through said control signal line of an acknowledge signal from said microcontroller.

2. A serial interface for a microcontroller comprising:
  a single serial data line coupling said serial interface to said microcontroller, said serial data line configured to carry data to and from said serial interface;
  a single control signal line coupling said serial interface to said microcontroller, said control signal line configured to carry at least one control signal to and from said serial interface, either one of said microcontroller or said serial interface capable of initiating a communication session; and
  a first and second antenna pin that are coupled to an antenna, said antenna being configured for wireless reception and transmission of at least one radio frequency signal data between said microcontroller and a remote device, wherein said serial interface is configured to acknowledge receipt of a data byte, upon receipt of said data byte from said microcontroller through said serial data line, by sending an acknowledge signal to said microcontroller through said control line.

3. A serial interface for a microcontroller comprising:
  a single serial data line coupling said serial interface to said microcontroller, said serial data line configured to carry data to and from said serial interface;
  a single control signal line coupling said serial interface to said microcontroller, said control signal line configured to carry at least one control signal to and from said serial interface, either one of said microcontroller or said serial interface capable of initiating a communication session; and
  a first and second antenna pin that are coupled to an antenna, said antenna being configured for wireless reception and transmission of at least one radio frequency signal data between said microcontroller and a remote device, wherein said serial interface is configured to transmit a data byte received through said antenna to said microcontroller through said serial data line upon receipt through said control signal line of an acknowledge signal from said microcontroller, receive a valid communication preamble signal from said antenna, receive a data byte from said antenna, await a reception of a control signal from said microcontroller through said control line before sending said data byte, and repeat said steps of receiving and sending data bytes until a valid communication stop signal is received from said antenna.

4. A serial interface as in claim 3 wherein said serial interface is configured to send a start byte to said microcontroller through said serial data line upon the reception of said valid communication preamble signal.

5. A serial interface as in claim 3 wherein said serial interface is configured to send a stop byte to said microcontroller upon the reception of said valid communication stop signal.

6. A serial interface as in claim 3 configured to extract an RF error detection code from said data bytes and insert an error code into said valid communication stop signal if an error is detected.

7. A serial interface for a microcontroller comprising:
- a single serial data line coupling said serial interface to said microcontroller, said serial data line configured to carry data to and from said serial interface;
- a single control signal line coupling said serial interface to said microcontroller, said control signal line configured to carry at least one control signal to and from said serial interface, either one of said microcontroller or said serial interface capable of initiating a communication session;
- a power output line to transmit regulated power to said microcontroller;
- a first and second antenna pin that are coupled to an antenna, said antenna being configured for wireless reception and transmission of at least one radio frequency signal data between said microcontroller and a remote device, wherein said serial interface is configured to receive a valid start frame signal from said microcontroller on said control signal line, transmit a communication preamble through said antenna; receive a first data byte from said microcontroller through said serial data line, transmit said first data byte through said antenna, send a control signal to said microcontroller through said control signal line to indicate reception of said first data byte, receive a next data byte from said microcontroller, transmit said next data byte through said antenna, send another control signal to said microcontroller to indicate reception of said next data byte, and repeat said steps of receiving data bytes from said serial data line, transmitting data bytes through said antenna and sending said control signals until a valid end of frame control signal is received from said microcontroller, whereupon a communication stop signal is transmitted through said antenna; and
- a converter of said data signal received through said antenna, said converter producing electrical power from said data signal.

8. A serial interface as in claim 7 configured to compute an RF error detection code based on said data bytes transmitted by said RF interface module, said error detection code transmitted through said antenna prior to the transmission of said communication stop signal.

* * * * *